T. BIRD.
FLYING MACHINE.
APPLICATION FILED NOV. 4, 1919.
1,364,174.
Patented Jan. 4, 1921.
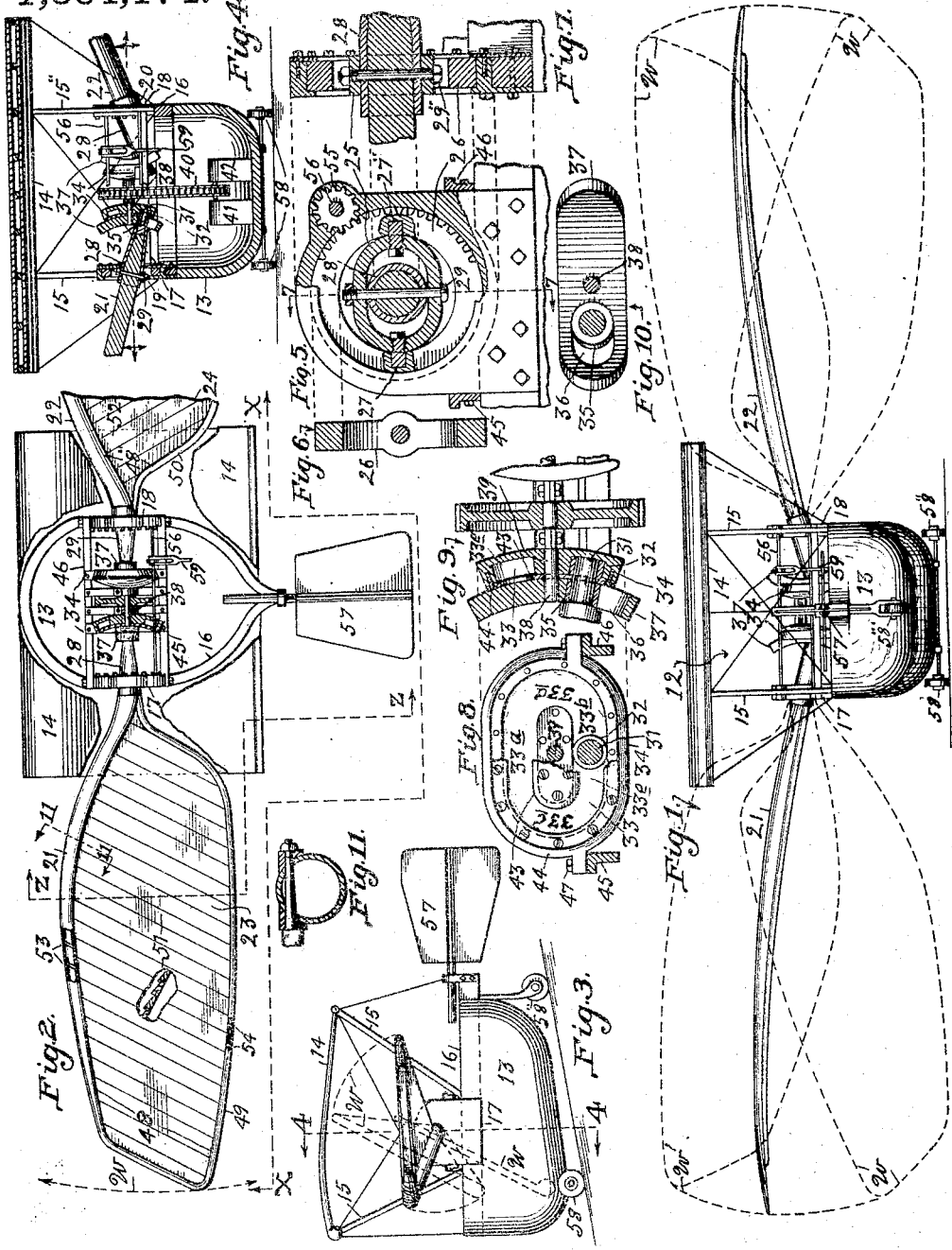
INVENTOR.
Thomas Bird.

UNITED STATES PATENT OFFICE.

THOMAS BIRD, OF JOHNSON CITY, TENNESSEE.

FLYING-MACHINE.

1,364,174.     Specification of Letters Patent.     Patented Jan. 4, 1921.

Application filed November 4, 1919. Serial No. 335,779.

*To all whom it may concern:*

Be it known that I, THOMAS BIRD, a citizen of the United States, residing at Johnson City, in the county of Washington and State of Tennessee, have invented a new and useful Flying-Machine, of which the following is a specification.

This invention relates to a flying machine and has for its object to provide a flying machine having wings operating similar to the wings of a bird.

Another object of the invention is to provide a flying machine having oscillating wings adapted to propel the machine.

A further object of the invention is to provide a flying machine with propellers in the form of and operating similar to the wings of a bird.

A still further object of the invention is to provide a flying machine having wings arranged to operate as propellers for driving the machine or as fixed planes operating as gliders.

Another object of the invention is to provide means whereby a wing plane of a flying machine is operated to move in the manner of a bird's wing.

With the above and such other objects as will hereinafter more fully appear I have invented the device illustrated in the accompanying drawings in which—

Figure 1 is a rear elevational view of one end of my flying machine on line *x—x* of Fig. 2.

Fig. 2 is a top plan view partly in section and partly broken away.

Fig. 3 is a side elevational view of the machine on line *z—z* of Fig. 2.

Fig. 4 is a sectional view on line 4—4 Fig. 3.

Fig. 5 is a detail sectional elevational view of a universal bearing box.

Fig. 6 is a detail sectional view of a bearing ring.

Fig. 7 is a section on line 7—7 Fig. 5.

Fig. 8 is a detail elevational view of a wing guiding disk for its operative movement to fly.

Fig. 9 is a vertical section of a wing operating and control mechanism.

Fig. 10 is a plan view of a wing actuating crank and

Fig. 11 is a section on line 11—11 Fig. 2.

Like reference characters indicate like parts throughout the following specification and in the several views in the drawings in which 12 indicates a flying machine which embraces in its structure a boat shaped body 13 having a main sustaining plane 14 supported by a suitable frame work 15. Mounted on the gunwale 16 of the boat on both sides thereof are a pair of oppositely arranged bearing box members 17 and 18 each having a universal joint structure 19 and 20 respectively for pivotally supporting the spars 21 and 22 of the wing shaped planes 23 and 24. The universal joints 19 and 20 each consists of an oblong ring 26 rotatably mounted in the ring gear 26 by means of screw pins 27 and 27''. Sleeve 28 on the spars 21 and 22 together with said spars are pivotally mounted within rings 25 and 26 by means of bolts 29 and 30. On the extreme end 31 of each spar is an anti-friction wheel 32, which operates in the oblong cyclic channel 33 in the guide disk members 34. For convenience of description the words "oblong cyclic channel" are used and the claims have the words "oblong rotating movement."

The words are used because the oblong cyclic channel on the concave face of the disks is not bounded by a regular curve; therefore is not an ellipse or oval but pertains to a circle; therefore a cyclic as it goes around a shaft near to it and far from it consequently becomes oblong.

The travel of the spar's inward ends and anti-friction wheels in the channels is two long out and in movements in opposite directions from the center of the disks and the center of length of the channels and thereby is a combined oblong forward and back rotating movement.

The arc of the wing's concave guiding disks 34, is described with the extreme end of the wing spar that extends inwardly into the guide channels 33 in the concave face of the disks 34, from the pivot bearing of said spars in the universal bearing boxes 17 and 18; consequently the center line of the wing spars from their pivot bearing center to the center of the concave disks is concentric. Therefore, the distance from the pivot bearing center to all points in the channel paths 33, at the bottom 33$^e$ thereof is the same. The said inward extensions of the wing spars operate as power levers to cause activity of the wings to propel; the dotted lines W indicate the paths and positions the wings will assume when operating to propel and fly.

The channel 33 or oblong cyclic path in the disks 34, is formed with two parallel channels 33ᵃ and 33ᵇ spaced apart near the opposite sides of a hole 39 that goes through in the center of the concave disk 34; from the hole they extend a long equal distance in opposite directions, and as pairs the opposite channel ends are joined together with arcuate channels 33ᶜ and 33ᵈ, thereby forming an oblong cyclic channel in the face of the concave disk 34, to cause a long combined forward and back flap or stroke of the wing.

Anti-friction wheels 35 are mounted inwardly of the anti-friction wheel 32 and operate in the elongated slot 36 in the operating crank 37 which is fixedly mounted upon the shaft 38 which operates loosely through the hole 39 in the center of the guide disk 34. The shaft 38 is operated through means of the sprocket chain 40 which is in turn operated through the medium of the engines 41 and 42. The members 34 are concavo-convex, their outer surfaces being concave and the members 37 are formed arcuate so as to conform to the concave surfaces of the members 34 against which they seat. The rotation of the shaft 38 rotates the members 37 causing the spars 21 and 22 to follow the course of the channel 33 in said members 34, thus the birdlike movement to the wings is given. Plates 43 and rings 44 are mounted so that their edges overlap the channels 33 and the anti-friction wheel 32 whereby the extreme inner ends of the spars and said wheels 32 are held within said channels. Channel irons 45 and 46 are mounted across the boat 13 and upon the gunwales 16 thereof. These angle irons form beams, or supports upon which the members 34 are fixedly mounted by means of bolts 47. The wings 23 and 24 consist of a frame work 48 formed of the spars 21 and 22 and the continuations 49 and 50 of said spars together with a series of shutter slats 51 and 52 pivotally mounted by means of pivots 53 and 54 in the members 21 and 49, and 22 and 50, said slats arranged to overlap one another in a rabbet to give a level surface and are so mounted at their opposite ends that upon the forward movement of the wings the slats open to permit the passage of air therethrough and upon the downward or backward movement of the wings the slats close to form the solid plane surface for operating against the air in order to drive the machine forward or sustain it as a glider plane as required. The position of the wings may be regulated by means of pinions 55 fixedly mounted upon a shaft 56, the rotation of which causes the pinions to operate the ring gears 26 simultaneously whereby a desired position of said wings may be obtained at will. 57 is a steering rudder of any desired arrangement and may be controlled by any common means. The boat 13 is mounted upon wheels 58 whereby the machine may land upon the ground and start therefrom, thus the device may start from either land or water. The plane 14 is the main sustaining plane. It also prevents fluctuation when flying, the wings 23 and 24 held stationary become planes in combination with the plane 14 with which the flying machine glides on in the air.

The plane and wing planes being above the body, the flying machine in the air will be liken to a parachute in the air; therefore in event of engine trouble the machine will descend slowly and with safety.

It is obvious that the position of the wing planes can be changed in the air with the universal bearing boxes by the aviator with the ratchet lever 59 mounted on the shaft 56 and held with it in any position required to fly. I do not claim the changing of the inclination of the pivot axis in the universal bearing box broadly. I know it is very old.

Of great importance in this invention is the formation of the oblong cyclic channel 33, in disks 34. This channel consists of a pair of parallel spaced apart channels 33ᵃ and 33ᵇ connected at their ends by arcuate channels 33ᶜ and 33ᵈ. This exact formation of the cyclic channel together with the concavity of the bottom wall 33ᵉ is necessary in order to give a precise birdlike movement of the wing planes.

It is to be understood that any desired number of wing planes may be used; three pairs will balance the flying machine. The center pair area is equal to the fore and aft pair, and to propel the small wings must be operated alike and the large wings alternately with them, and thereby continuous steady propulsion insured.

It is obvious the spars and wing planes cannot revolve about themselves, the universal pivot bearings prevents the act.

Having now described my invention that which I claim to be new and desire to procure by Letters Patent is—

1. In a flying machine wing planes and means whereby a combined forward and back oblong rotating movement may be imparted thereto, means whereby the position of said wing planes relative to the machine may be controlled simultaneously, said former means embracing fixed disk members having channels therein, said wings having frame works embracing spars the ends of which operate in said channels, said disks having concave outer surfaces in which said spars operate.

2. In a flying machine wing planes and means whereby a combined forward and back oblong rotating movement may be imparted thereto, means whereby the position of said wing planes relative to the machine may be changed, and controlled simultaneously, said former means embracing fixed disk members having channels therein, said wings having frame works embracing spars the ends of which operate in said channels, said disks having concave outer surfaces in which said spars operate.

3. In a flying machine wing planes and means whereby a combined forward and back oblong rotating movement may be imparted thereto, means whereby the position of said wing planes relative to the machine may be changed, and controlled simultaneously, said former means embracing fixed disk members having channels therein, said wings having frame works embracing spars the ends of which operate in said channels, said disks having concave outer surfaces in which said spars operate, means whereby said spars are operated in said channels.

4. In a flying machine wing planes and means whereby a combined forward and back oblong rotating movement may be imparted thereto, means whereby the position of said wing planes relative to the machine may be changed, and controlled simultaneously, said former means embracing fixed disk members having channels therein, said wings having frame works embracing spars the ends of which operate in said channels, said disks having concave outer surfaces in which said spars operate, means whereby said spars are operated in said channels, said channels being oblong.

5. In a flying machine wing planes and means whereby a combined forward and back oblong rotating movement may be imparted thereto, means whereby the position of said wing planes relative to the machine may be changed, and controlled simultaneously, said former means embracing fixed disk members having channels therein, said wings having frame works embracing spars the ends of which operate in said channels, said disks having concave outer surfaces in which said spars operate, means whereby said spars are operated in said channels, said channels being oblong, said last means consisting of rotatable cranks having openings through which said spars project.

6. In a flying machine wing planes and means whereby a combined forward and back oblong rotating movement may be imparted thereto, means whereby the position of said wing planes relative to the machine may be changed, and controlled simultaneously, said former means embracing fixed disk members having channels therein, said wings having frame works embracing spars the ends of which operate in said channels, said disks having concave outer surfaces in which said spars operate, means whereby said spars are operated in said channels, said channels being oblong, said last means consisting of rotatable cranks having openings through which said spars project, a driven shaft upon which said levers are fixedly mounted.

7. In a flying machine wing planes and means whereby a combined forward and back oblong rotating movement may be imparted thereto, means whereby the position of said wing planes relative to the machine may be changed, and controlled simultaneously, said former means embracing fixed disk members having channels therein, said wings having frame works embracing spars the ends of which operate in said channels, said disks having concave outer surfaces in which said spars operate, means whereby said spars are operated in said channels, said channels being oblong, said last means consisting of rotatable cranks having openings through which said spars project, a driven shaft upon which said cranks are fixedly mounted, said wing planes formed of overlapping slats pivoted in the frame work therefor.

8. In a flying machine wing planes and means whereby a combined forward and back oblong rotating movement may be imparted thereto, means whereby the position of said wing planes relative to the machine may be changed, and controlled simultaneously, said former means embracing fixed disk members having channels therein, said wings having frame works embracing spars the ends of which operate in said channels, said disks having concave outer surfaces in which said spars operate, means whereby said spars are operated in said channels, said channels being oblong, said last means consisting of rotatable cranks having openings through which said spars project, a driven shaft upon which said cranks are fixedly mounted, said wing planes formed of overlapping slats pivoted in the frame work therefor, said second means consisting of rotatable bearing members.

9. In a flying machine wing planes and means whereby a combined forward and back oblong rotating movement may be imparted thereto, means whereby the position of said wing planes relative to the machine may be changed, and controlled simultaneously, said former means embracing fixed disk members having channels therein, said wings having frame works embracing spars the ends of which operate in said channels, said disks having concave outer surfaces in which said spars operate, means whereby said spars are operated in said channels, said channels being oblong, said last means consisting of rotatable cranks having openings through which said spars project, a driven shaft upon which said cranks are fixedly mounted, said wing planes formed of overlapping slats pivoted in the frame work therefor, said second means consisting of rotatable bearing members, said spars having universal movement in said bearing members.

10. In a flying machine wing planes and means whereby a combined forward and back oblong rotating movement may be imparted thereto, means whereby the position of said wing planes relative to the machine may be changed, and controlled simultaneously, said former means embracing fixed disk members having channels therein, said wings having frame works embracing spars the ends of which operate in said channels, said disks having concave outer surfaces in which said spars operate, means whereby said spars are operated in said channels, said channels being oblong, said last means consisting of rotatable cranks having openings through which said spars project, a driven shaft upon which said cranks are fixedly mounted, said wing planes formed of overlapping slats pivoted in the frame work therefor, said second means consisting of rotatable bearing members, said spars having universal movement in said bearing members, means whereby said bearing members may be rotated.

THOMAS BIRD.

Witnesses:
 GEO. LOGAN,
 E. D. HANKS.